US010999595B2

(12) United States Patent
Lin et al.

(10) Patent No.: US 10,999,595 B2
(45) Date of Patent: *May 4, 2021

(54) METHOD AND APPARATUS OF MOTION VECTOR PREDICTION OR MERGE CANDIDATE DERIVATION FOR VIDEO CODING

(71) Applicant: MEDIATEK INC., Hsin-Chu (TW)

(72) Inventors: Jian-Liang Lin, Su'ao Township, Yilan County (TW); Tzu-Der Chuang, Zhubei (TW); Yu-Wen Huang, Taipei (TW); Yi-Wen Chen, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 352 days.

This patent is subject to a terminal disclaimer.

(21) Appl. No.: 15/776,154

(22) PCT Filed: Nov. 8, 2016

(86) PCT No.: PCT/CN2016/105004
§ 371 (c)(1),
(2) Date: May 15, 2018

(87) PCT Pub. No.: WO2017/084512
PCT Pub. Date: May 26, 2017

(65) Prior Publication Data
US 2020/0260102 A1    Aug. 13, 2020

Related U.S. Application Data

(60) Provisional application No. 62/257,757, filed on Nov. 20, 2015.

(51) Int. Cl.
*H04N 19/517*    (2014.01)
*H04N 19/105*    (2014.01)
(Continued)

(52) U.S. Cl.
CPC ......... *H04N 19/517* (2014.11); *H04N 19/105* (2014.11); *H04N 19/159* (2014.11);
(Continued)

(58) Field of Classification Search
CPC ...... H04N 19/52; H04N 19/56; H04N 19/159; H04N 19/513; H04N 19/573
See application file for complete search history.

(56) References Cited

U.S. PATENT DOCUMENTS 8,824,558 B2 * 9/2014 Lin ................... H04N 19/577
375/240.2
9,124,898 B2 * 9/2015 Tsai ................... H04N 19/517
(Continued)

FOREIGN PATENT DOCUMENTS

| CA | 2 840 381 A1 | 1/2013 |
|---|---|---|
| CN | 102934434 A | 2/2013 |
| CN | 104396244 A | 3/2015 |

OTHER PUBLICATIONS

RD Optimized Coding for Motion Vector Predictor Selection; Laroche; 2008; (Year: 2008).*
(Continued)

*Primary Examiner* — Luis Perez-Fuentes
(74) *Attorney, Agent, or Firm* — McClure, Qualey & Rodack, LLP

(57) ABSTRACT

A method and apparatus of priority-based MVP (motion vector predictor) derivation for motion compensation in a video encoder or decoder are disclosed. According to this method, one or more final motion vector predictors (MVPs) are derived using priority-based MVP derivation process. The one or more final MVPs are derived by selecting one or more firstly available MVs from a priority-based MVP list for Inter prediction mode, Skip mode or Merge mode based on reference data of one or two target reference pictures that are reconstructed prior to the current block according to a
(Continued)

priority order. Therefore, there is no need for transmitting information at the encoder side nor deriving information at the decoder side that is related to one or more MVP indices to identify the one or more final MVPs in the video bitstream.

20 Claims, 6 Drawing Sheets

(51) Int. Cl.
      *H04N 19/159*     (2014.01)
      *H04N 19/176*     (2014.01)
      *H04N 19/46*      (2014.01)
      *H04N 19/70*      (2014.01)

(52) U.S. Cl.
      CPC ........... *H04N 19/176* (2014.11); *H04N 19/46* (2014.11); *H04N 19/70* (2014.11)

(56) References Cited

U.S. PATENT DOCUMENTS

| | | | | |
|---|---|---|---|---|
| 9,736,498 | B2* | 8/2017 | Lin | .......................... H04N 19/52 |
| 9,872,016 | B2* | 1/2018 | Chuang | .................. H04N 19/70 |
| 9,961,364 | B2 | 5/2018 | Tsai et al. | |
| 9,967,586 | B2* | 5/2018 | Lin | ....................... H04N 19/573 |
| 9,992,512 | B2* | 6/2018 | Chuang | ................ H04N 19/577 |
| 10,412,407 | B2* | 9/2019 | Lin | ....................... H04N 19/176 |
| 10,863,170 | B2 | 12/2020 | Rusanovskyy et al. | |
| 2012/0008688 | A1 | 1/2012 | Tsai et al. | |
| 2014/0086325 | A1 | 3/2014 | Chen et al. | |
| 2015/0163506 | A1 | 6/2015 | Chon et al. | |
| 2015/0358598 | A1* | 12/2015 | Lin | ....................... H04N 19/597 |
| | | | | 375/240.16 |
| 2017/0310988 | A1* | 10/2017 | Lin | ....................... H04N 19/513 |
| 2018/0324454 | A1* | 11/2018 | Lin | ....................... H04N 19/159 |

OTHER PUBLICATIONS

Low-complexity merge candidate decision for fast HEVC coding; Li; 2013; (Year: 2013).*
Spatial Correlation-Based MVP for Video-Coding; Jiang; 2019; (Year: 2019).*
NPL Google Search; 2020; (Year: 2020).*
International Search Report dated Jan. 25, 2017, issued in application No. PCT/CN2016/105004.
Chinese language office action dated Jan. 4, 2021, issued in application No. CN 201680067802.1.

* cited by examiner

METHOD AND APPARATUS OF MOTION VECTOR PREDICTION OR MERGE CANDIDATE DERIVATION FOR VIDEO CODING

CROSS REFERENCE TO RELATED APPLICATIONS

The present invention claims priority to U.S. Provisional Patent Application Ser. No. 62/257,757, filed on Nov. 20, 2015. The U.S. Provisional patent application is hereby incorporated by reference in its entirety.

TECHNICAL FIELD

The present invention relates to motion compensation for video coding using decoder side derived motion information. In particular, the present invention relates to improving performance of Inter, Merge and Skip modes by using decoder side derived MVP (motion vector predictor) candidate list.

BACKGROUND

The advances of digital video coding standards have resulted in successes of multimedia systems such as smartphones, digital TVs, and digital cameras for the past decade. After standardization activities of H.261, MPEG-1, MPEG-2, H.263, MPEG-4, and H.264/AVC, the demand for improving video compression performance has been still strong due to requirements of larger picture resolutions, higher frame rates, and better video qualities. Therefore, the efforts to develop for new video coding techniques to further improve coding efficiency beyond H.264/AVC are never ending. A new international video coding standard, named High Efficiency Video Coding (HEVC) has been deloped based on a hybrid block-based motion-compensated transform coding architecture. The basic unit for compression is termed coding tree unit (CTU). Each CTU may contain one coding unit (CU) or recursively split into four smaller CUs until the predefined minimum CU size is reached. Each CU (also named leaf CU) contains one or multiple prediction units (PUs) and a tree of transform units (TUs).

In general, a CTU consists of one luma coding tree block (CTB) and two corresponding chroma CTBs. A CU consists of one luma coding block (CB) and two corresponding chroma CBs. A PU consists of one luma prediction block (PB) and two corresponding chroma PBs. A TU consists of one luma transform block (TB) and two corresponding chroma TBs. However, exceptions may occur because the minimum TB size is 4×4 for both luma and chroma (i.e., no 2×2 chroma TB supported for 4:2:0 color format) and each Intra chroma CB always has only one Intra chroma PB regardless of the number of Intra luma PBs in the corresponding Intra luma CB.

For an Intra CU, the luma CB can be predicted by one or four luma PBs, and each of the two chroma CBs is always predicted by one chroma PB. In other words, each luma PB has one Intra luma prediction mode and the two chroma PBs share one Intra chroma prediction mode. Moreover, for the Intra CU, the TB size cannot be larger than the PB size. In each PB, the Intra prediction is applied to predict samples of each TB inside the PB from neighboring reconstructed samples of the TB. For each PB, in addition to 33 directional Intra prediction modes, DC and planar modes are also supported to predict flat regions and gradually varying regions, respectively.

For each Inter PU, one of three prediction modes including Inter, Skip and Merge modes, can be selected. Generally speaking, a motion vector competition (MVC) scheme is used to select a motion candidate from a given candidate set that includes spatial and temporal motion candidates. Multiple references to the motion estimation allow for finding the best reference in two possible reconstructed reference picture list (namely List 0 and List 1). For the Inter mode (unofficially termed AMVP mode, where AMVP stands for advanced motion vector prediction), Inter prediction indicators (List 0, List 1, or bi-directional prediction), or two reference indices for indicating one or two target reference pictures, one or two motion candidate indices for indicating one or two selected candidates in the list, motion vector differences (MVDs) and prediction residual are transmitted. As for the Skip mode and the Merge mode, only Merge indices are transmitted for indicating one or two selected MVPs (motion vector predictors) in the candidate list, and the current PU inherits the Inter prediction indicator, reference indices, and motion vectors from a neighboring PU referred by the coded Merge index. In the case of a Skip coded CU, the residual signal is also omitted. Quantization, entropy coding, and deblocking filter (DF) are also in the coding loop of HEVC. The basic operations of these three modules are conceptually similar to those used in H.264/AVC, but differ in details.

Sample adaptive offset (SAO) is a new in-loop filtering technique applied after deblocking filter (DF). SAO aims to reduce sample distortion by classifying deblocked samples into different categories and then adding an offset to deblocked samples of each category.

FIG. 1 illustrates an exemplary adaptive Inter/Intra video coding system incorporating loop processing. For Inter-prediction, Motion Estimation (ME)/Motion Compensation (MC) 112 is used to provide prediction data based on video data from other picture or pictures. Switch 114 selects Intra Prediction 110 or Inter-prediction data and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion, coding modes, and other information associated with the image area. The side information may also be compressed by entropy coding to reduce required bandwidth. Accordingly, the data associated with the side information are provided to Entropy Encoder 122 as shown in FIG. 1. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1, incoming video data undergoes a series of processing in the encoding system. The reconstructed video data from REC 128 may be subject to various impairments due to a series of processing. Therefore, In-loop filter 130 is often applied to the reconstructed video data before the reconstructed video data are stored in the Reference Picture Buffer 134 in order to improve video quality. For example, deblocking filter (DF) and Sample Adaptive Offset (SAO) have been used in the High Efficiency Video Coding (HEVC) standard. The in-loop filter information may have to be incorporated in the bitstream so that a decoder can properly recover the required information. Therefore, in-loop filter information is provided to Entropy Encoder 122 for incorporation into the bitstream. In FIG. 1, in-loop filter 130 is applied to the reconstructed video before the reconstructed samples are stored in the reference picture buffer 134. The system in FIG. 1 is intended to illustrate an exemplary structure of a typical video encoder.

FIG. 2 illustrates a system block diagram of a corresponding video decoder for the encoder system in FIG. 1. Since the encoder also contains a local decoder for reconstructing the video data, some decoder components are already used in the encoder except for the entropy decoder 210. Furthermore, only motion compensation 220 is required for the decoder side. The switch 146 selects Intra-prediction or Inter-prediction and the selected prediction data are supplied to reconstruction (REC) 128 to be combined with recovered residues. Besides performing entropy decoding on compressed residues, entropy decoding 210 is also responsible for entropy decoding of side information and provides the side information to respective blocks. For example, Intra mode information is provided to Intra-prediction 110, Inter mode information is provided to motion compensation 220, loop filter information is provided to loop filter 130 and residues are provided to inverse quantization 124. The residues are processed by IQ 124, IT 126 and subsequent reconstruction process to reconstruct the video data. Again, reconstructed video data from REC 128 undergo a series of processing including IQ 124 and IT 126 as shown in FIG. 2 and are subject to coding artefacts. The reconstructed video data are further processed by In-loop filter 130 before the reconstructed pictures are stored in the reference picture buffer 134.

As mentioned earlier, motion vector prediction is widely used in recent advanced video coding as coding tool to reduce bits required for motion information coding. The motion vector prediction process includes generating a motion vector candidate list and pruning the candidate list to remove redundancy. A brief description of the generation process and pruning process are reviewed as follows.

Competitive Spatial-Temporal Motion Candidate in Inter Prediction

There are three prediction modes for the Inter prediction in HEVC, including the Inter mode, Skip mode and Merge mode. For all these three modes, a motion vector competition (MVC) scheme is applied to select one motion candidate among a given candidate list containing spatial and temporal motion candidates. The MVC scheme may increase the coding efficiency of the MV prediction and MV coding.

For the Inter mode, an Inter prediction indicator is transmitted to denote list-0 prediction, list-1 prediction, or bi-prediction. Next, one or two reference indices are transmitted when there are multiple reference pictures. An index is transmitted for each prediction direction to select one motion candidate from the candidate list. As shown in FIG. 3, the candidate list for the Inter mode includes two spatial motion candidates and one temporal motion candidate:

1. Left candidate (the first available from $A_0$, $A_1$);
2. Top candidate (the first available from $B_0$, $B_1$, $B_2$);
3. Temporal candidate (the first available from $T_{BR}$ and $T_{CT}$).

The left spatial motion candidate is searched from the below left to the left (i.e., $A_0$ and $A_1$ located in the current picture) and the first available one is selected as the left candidate, while the top spatial motion candidate is searched from the above right to the above left (i.e., $B_0$, $B_1$, and $B_2$ located in the current picture) and the first available one is selected as the top candidate. A temporal motion candidate is derived from a block ($T_{BR}$ or $T_{CT}$) located in a reference picture, which is termed temporal collocated picture. The temporal collocated picture is indicated by transmitting a flag in the slice header to specify which reference picture list. Also one reference index in slice header is transmitted to indicate which reference picture in the reference list is used as the collocated reference picture. After the index is transmitted, one or two corresponding motion vector differences (MVDs) are transmitted.

For the Skip mode and Merge mode, a Merge index is signalled to indicate which candidate in the merging candidate list is used. No Inter prediction indicator, reference index, or MVD is transmitted. Each PU of the Skip or Merge mode reuses the Inter prediction indicator, reference index (or indices), and motion vector(s) of the selected candidate. It is noted that if the selected candidate is a temporal motion candidate, the reference index is always set to 0. As shown in FIG. 3, the merging candidate list for the Skip mode and the Merge mode includes four spatial motion candidates and one temporal motion candidate:

1. Left candidate ($A_1$);
2. Top candidate ($B_1$);
3. Above right candidate ($B_0$);
4. Below left candidate ($A_0$);
5. Above left candidate ($B_2$), used only when any of the above spatial candidates is unavailable;
6. Temporal candidate (the first available from $T_{BR}$ and $T_{CT}$).

Redundancy Removal and Additional Motion Candidates

For the Inter mode, Skip mode, and Merge mode, after deriving the spatial motion candidates, a pruning process is performed to check the redundancy among the spatial candidates.

After removing redundant or unavailable candidates, the size of the candidate list can be adjusted dynamically at both the encoder and decoder sides so that the truncated unary binarization can be beneficial for entropy coding of the index. Although the dynamic size of candidate list could bring coding gains, it also introduces a parsing problem. Because the temporal motion candidate is included in the candidate list, when a MV of a previous picture cannot be decoded correctly, a mismatch between the candidate list on the encoder side and the decoder side may occur, which results in a parsing error of the candidate index. This parsing error can propagate from frame to frame, and may even cause the rest of the current picture unable to be parsed or decoded properly. What is even worse, this parsing error can affect subsequent Inter pictures that also allow temporal motion candidates. Therefore, one small decoding error of a MV may cause failures of parsing many subsequent pictures.

In HEVC, in order to solve the mentioned parsing problem, a fixed candidate list size is used to decouple the candidate list construction and the parsing of the index. Moreover, in order to compensate the coding performance loss caused by the fixed list size, additional candidates are assigned to the empty positions in the candidate list. In this process, the index is coded in truncated unary codes of a maximum length, where the maximum length is transmitted in the slice header for the Skip mode and Merge mode and fixed to two for the Inter mode.

For the Inter mode, a zero vector motion candidate is added to fill the empty positions in the AMVP candidate list after the derivation and pruning of the two spatial motion candidates and the one temporal motion candidate. As for the Skip mode and Merge mode, after the derivation and pruning of the four spatial motion candidates and the one temporal motion candidate, if the number of available candidates is smaller than the fixed candidate list size, additional candidates are derived and added to fill the empty positions in the merging candidate list.

Two types of additional candidates are used to fill the merging candidate list: the combined bi-predictive motion candidate and the zero vector motion candidate. The combined bi-predictive motion candidates are created by combining two original motion candidates according to a predefined order. FIG. 4 illustrates an example of generating a bi-predictive motion candidate 444 by combining two original motion candidates 440 and 442. Candidate list 410 corresponds to an original list containing two candidates: mvL0_A with ref0 and mvL1_B with ref0. Motion vector mvL0_A points from the current block in the current picture 430 to a reference block in a reference picture L0R0 432 in list 0. Motion vector mvL1_B points from the current block in the current picture 430 to a reference block in a reference picture L1R0 434 in list 1. The update candidate list 420 includes this combined bi-predictive motion candidate 444. After adding the combined bi-predictive motion candidates, if the merging candidate list still has empty position(s), zero vector motion candidates are added to the remaining positions.

In VCEG-AZ07 AZ07 (Jianle Chen, et al., Further improvements to HMKTA-1.0, ITU—Telecommunications Standardization Sector, Study Group 16 Question 6, Video Coding Experts Group (VCEG), 52nd Meeting: 19-26 Jun. 2015, Warsaw, Poland), a decoder side MV derivation method is proposed. In this method, a FRUC_mrg_flag is signaled when the merge_flag or skip_flag is true. If the FRUC_mrg_flag is 1, then a FRUC_merge_mode is signalled to indicate whether the bilateral matching Merge mode (as shown in FIG. 5) or template matching Merge mode (as shown in FIG. 6) is selected. FIG. 5 illustrates an example of FRUC (Frame-Rate Up-Conversion) bilateral matching mode, where the motion information for a current block 510 is derived based on two reference pictures. The motion information of the current block 510 is derived by finding the best match between two blocks (520 and 530) along the motion trajectory 540 of the current block 510 in two different reference pictures (i.e., Ref0 and Ref1). Under the assumption of continuous motion trajectory, the motion vectors MV0 associated with Ref0 and MV1 associated with Ref1 pointing to the two reference blocks 520 and 530 shall be proportional to the temporal distances, i.e., TD0 and TD1, between the current picture (i.e., Cur pic) and the two reference pictures (i.e., Ref0 and Ref1).

FIG. 6 illustrates an example of template matching FRUC mode. The neighbouring areas (620a and 620b) of the current block 610 in a current picture (i.e., Cur pic) are used as a template to match with a corresponding template (630a and 630b) in a reference picture (i.e., Ref0). The best match between template 620a/620b and template 630a/630b will determine a decoder derived motion vector 640. While Ref0 is shown in FIG. 6, Ref1 can also be used as a reference picture.

In the decoder side MV derivation method, a new temporal MVP called temporal derived MVP is also used, where the MVP is derived by scanning all MVs in all reference frames. To derive the LIST_0 temporal derived MVP, for each LIST_0 MV in the LIST_0 reference frames, the MV is scaled to point to the current frame. The 4×4 block that pointed by this scaled MV in current frame is the target current block. The MV is further scaled to point to the reference picture that refIdx is equal 0 in LIST_0 for the target current block. The further scaled MV is stored in the LIST_0 MV field for the target current block. FIG. 7 illustrates examples for deriving the temporal derived MVPs for List 0 and List 1 respectively. In FIG. 7, each small square block corresponds to a 4×4 block. The temporal derived MVPs process scans all the MVs in all 4×4 blocks in all reference pictures to generate the temporal derived LIST_0 and LIST_1 MVPs of current frame. For example, in FIG. 7, blocks 710, blocks 712 and blocks 714 correspond to 4×4 blocks of the current picture, List 0 reference picture with index equal to 0 (i.e., refidx=0) and List 0 reference picture with index equal to 1 (i.e., refidx=1) respectively. Motion vectors 720 and 730 for two blocks in List 0 reference picture with index equal to 1 are known. Then, temporal derived MVP 722 and 732 can be derived by scaling motion vectors 720 and 730 respectively. The scaled MVP is then assigned it to a corresponding block.

For bilateral matching Merge mode and template matching Merge mode, the two-stage matching is applied. The first stage is PU-level matching, and the second stage is the sub-PU-level matching. In the PU-level matching, several starting MVs in LIST_0 and LIST_1 are selected respectively. These MVs include the MVs from Merge candidates and MVs from temporal derived MVPs. Two different staring MV sets are generated for two lists. For each MV in one list, a MV pair is generated by composing of this MV and the mirrored MV that is derived by scaling the MV to the other list. For each MV pair, two reference blocks are compensated by using this MV pair. The sum of absolutely differences (SAD) of these two blocks is calculated. The MV pair with the smallest SAD is the best MV pair. Then, the diamond search is performed to refine the MV pair. The refinement precision is ⅛-pel. The refinement search range is restricted within ±1 pixel. The final MV pair is the PU-level derived MV pair.

For the second stage sub-PU-level searching, the current PU is divided into sub-PUs. The depth of sub-PU is signalled in Sequence Parameter Set (SPS) (e.g. 3). Minimum sub-PU size is 4×4 block. For each sub-PU, several starting MVs in LIST_0 and LIST_1 are selected, which includes MV of PU-level derived MV, zero MV, HEVC collocated TMVP of current sub-PU and bottom-right block, temporal derived MVP of current sub-PU, and MVs of left and above PU/sub-PU. By using the similar mechanism in PU-level searching, the best MV pair for the sub-PU is selected. The diamond search is performed to refine the MV pair. The motion compensation for this sub-PU is performed to generate the predictor for this sub-PU.

For template matching Merge mode, the reconstructed pixels of above 4 rows and left 4 columns are used to form a template. The template matching is performed to find the best matched template with its corresponding MV. Two stage matching is also applied for template matching. In the PU-level matching, several starting MVs in LIST_0 and LIST_1 are selected respectively. These MVs includes the MVs from Merge candidates and MVs from temporal derived MVPs. Two different staring MV sets are generated for two lists. For each MV in one list, the SAD cost of the template with the MV is calculated. The MV with the smallest cost is the best MV. Then, the diamond search is performed to refine the MV. The refinement precision is ⅛-pel. The refinement search range is restricted within ±1 pixel. The final MV is the PU-level derived MV. The MVs in LIST_0 and LIST_1 are generated independently.

For the second stage sub-PU-level searching, the current PU is divided into sub-PUs. The depth of sub-PU is signalled in SPS (e.g. 3). Minimum sub-PU size is 4×4 block. For each sub-PU at left or top PU boundaries, several starting MVs in LIST_0 and LIST_1 are selected, which includes MV of PU-level derived MV, zero MV, HEVC collocated TMVP of current sub-PU and bottom-right block, temporal derived MVP of current sub-PU, and MVs of left and above PU/sub-PU. By using the similar mechanism in PU-level searching, the best MV pair for the sub-PU is selected. The diamond search is performed to refine the MV pair. The motion compensation for this sub-PU is performed to generate the predictor for this sub-PU. For those PUs which are not at left or top PU boundaries, the second stage sub-PU-level searching is not applied, and the corresponding MVs are set equal to the MVs in the first stage.

In this decoder side MV derivation method, the template matching is also used to generate a MVP for Inter mode coding. When a reference picture is selected, the template matching is performed to find a best template on the selected reference picture. Its corresponding MV is the derived MVP. This MVP is inserted into the first position in AMVP.

SUMMARY

A method and apparatus of priority-based MVP (motion vector predictor) derivation for motion compensation in a video encoder or decoder are disclosed. According to this method, one or more final motion vector predictors (MVPs) are derived using a priority-based MVP derivation process. The one or more final MVPs are derived by selecting one or more firstly available MVs from a priority-based MVP list for Inter prediction mode, Skip mode or Merge mode based on reference data of one or two target reference pictures that are reconstructed prior to the current block according to a priority order. Therefore, there is no need for transmitting information at the encoder side nor deriving information at the decoder side that is related to one or more MVP indices to identify the one or more final MVPs in the video bitstream. The final MVPs are then used for encoding or decoding the current block.

The priority-based MVP list for the Inter prediction mode, Skip mode or Merge mode may include one or more MVPs associated with a bilateral matching mode or a template matching mode. The one or more MVPs associated with the bilateral matching mode or the template matching mode are located at a top priority location in the priority-based MVP list.

When the current block is coded using the Inter prediction mode, an Inter prediction indicator can be signalled at the encoder side and derived from the video bitstream at the decoder side, where the Inter prediction indicator indicates whether the current block is coded using list-0 prediction, list-1 prediction or bi-prediction. When list-0 prediction or list-1 prediction is used and more than one reference picture exists in corresponding list 0 or list 1, one reference index can be signalled at the encoder side and derived from the video bitstream at the decoder side to identify said one target reference picture in the corresponding list 0 or list 1. When the bi-prediction is used and more than one reference picture exists in both the list 0 and the list 1, two reference indices can be signalled at the encoder side and derived from the video bitstream at the decoder side to identify said two target reference pictures in the list 0 and the list 1.

When the current block is coded using the Skip mode or Merge mode, an Inter prediction indicator for indicating whether the current block is coded using list-0 prediction, list-1 prediction or bi-prediction, and one or more reference indices for identifying one or two target reference pictures in corresponding list 0, list 1, or both will not be signalled at the encoder side and are inherited from the one or more final MVPs at the decoder side. If no candidate is available in the priority-based MVP list, a default value is assigned to said one or more final MVPs. Information related to the priority order can be signalled at the encoder side and derived at the decoder side from a syntax level or header in the video bitstream corresponding to a sequence, view, picture, slice, SPS (sequence parameter set), VPS (video parameter set), APS (adaptation parameter set), CTU (coding tree unit), CTB (coding tree block), LCU (largest coding tree), CU (coding unit), PU (prediction unit), TU (transform unit) level, or a combination thereof Information related to the priority order may also be derived implicitly according to statistic of coded MV information from one or more previously coded blocks in the current slice or picture or in a previous coded slice or picture. Furthermore, the priority order may also correspond to a pre-defined priority order.

A flag may be signalled at the encoder side and derived at the decoder side from the video bitstream to control whether said priority-based MVP derivation process or a conventional MVP derivation process is used to derive said one or more final MVPs, and wherein the flag is in a syntax level or header of the video bitstream corresponding to a sequence, view, picture, slice, SPS (sequence parameter set), VPS (video parameter set), APS (adaptation parameter set), CTU (coding tree unit), CTB (coding tree block), LCU (largest coding tree), CU (coding unit), PU (prediction unit), TU (transform unit) level, or a combination thereof.

In one embodiment, when the current block is coded using bi-prediction, said priority-based MVP derivation process is used to derive said one or more final motion vector predictors (MVPs) for one reference list and a conventional MVP derivation process is used to derive said one or more final motion vector predictors (MVPs) for another reference list.

DETAILED DESCRIPTION

Figure 1:
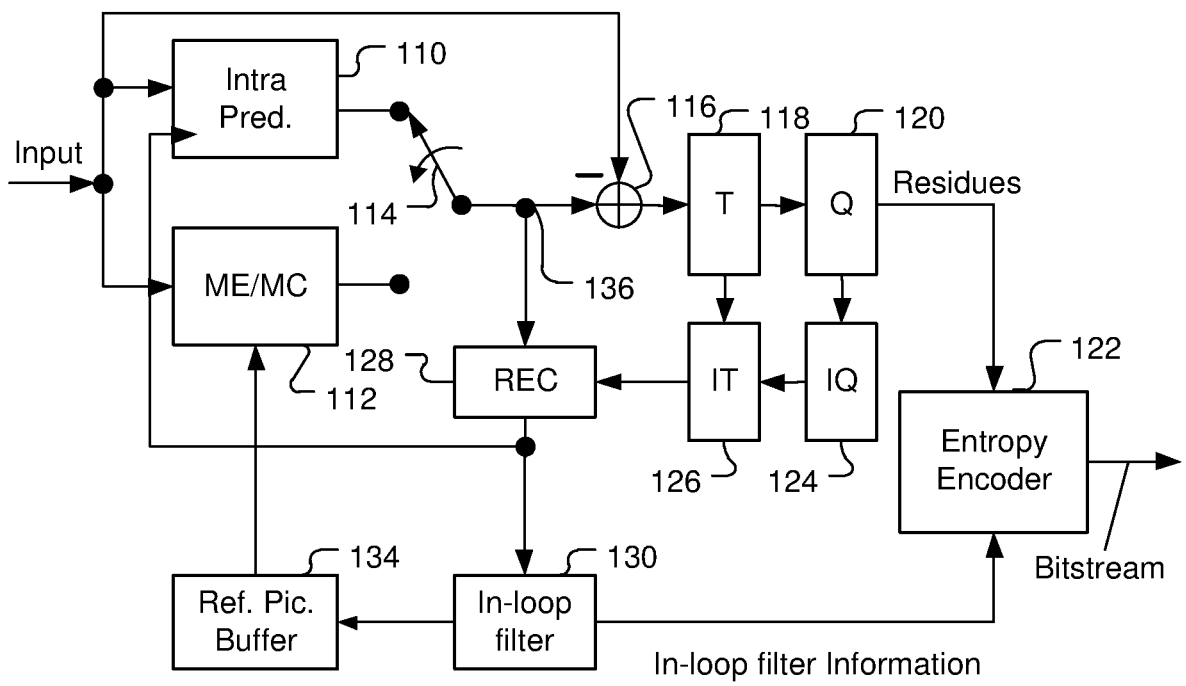
FIG. 1 illustrates an exemplary block diagram of a video encoder using adaptive Inter/Intra prediction.
Figure 2:
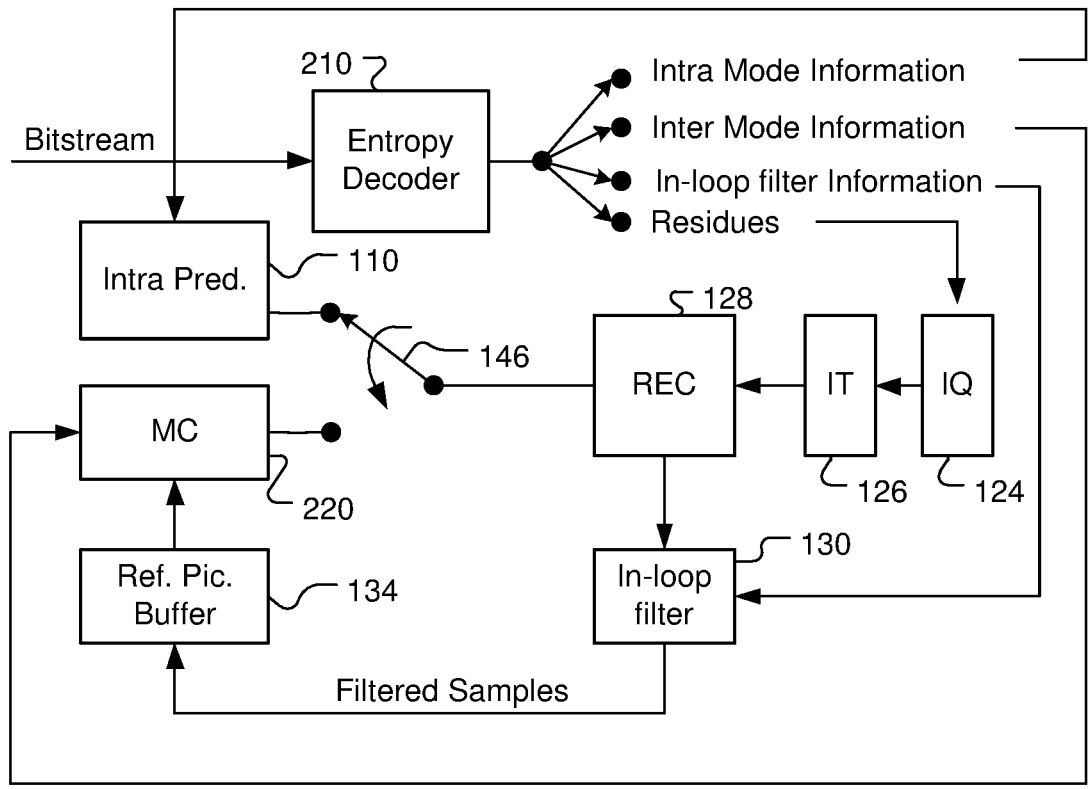
FIG. 2 illustrates an exemplary block diagram of a video decoder using adaptive Inter/Intra prediction.
Figure 3:
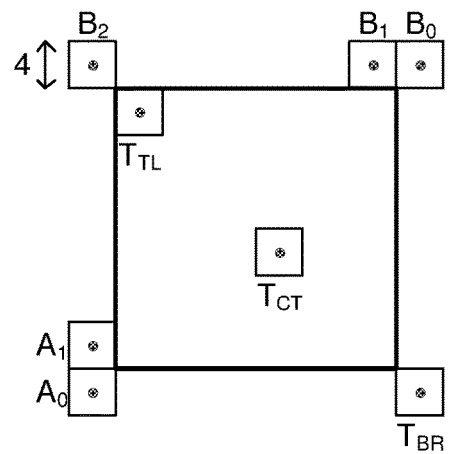
FIG. 3 illustrates an example of candidate list for the Inter, Merge and Skip modes according to HEVC.
Figure 4:
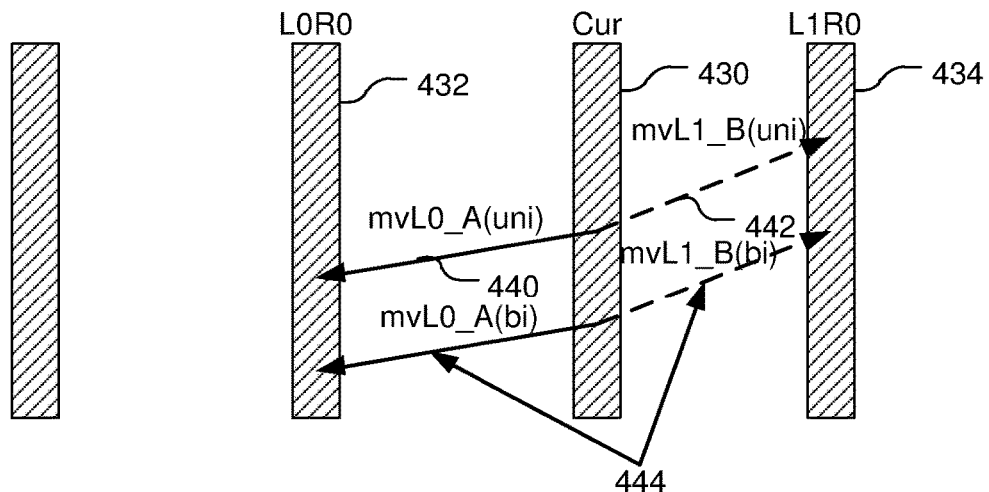
FIG. 4 illustrates an example of generating a bi-predictive motion candidate by combining two original motion candidates and the generated bi-predictive motion candidate is inserted into the candidate list.
Figure 5:
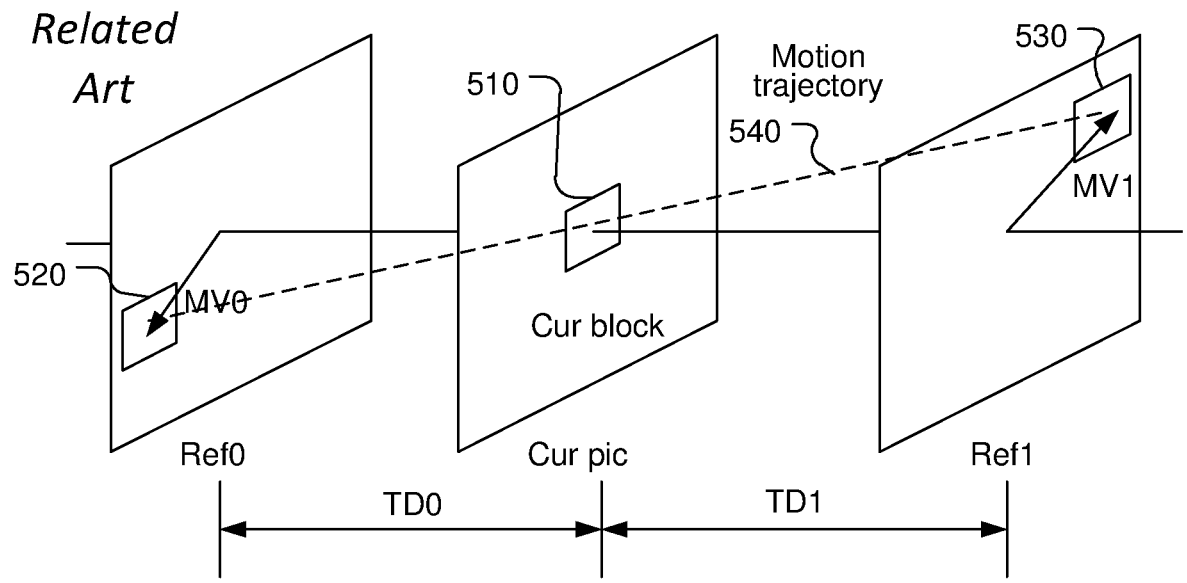
FIG. 5 illustrates an example of motion compensation using the bilateral matching technique, where a current block is predicted by two reference blocks along the motion trajectory.
Figure 6:
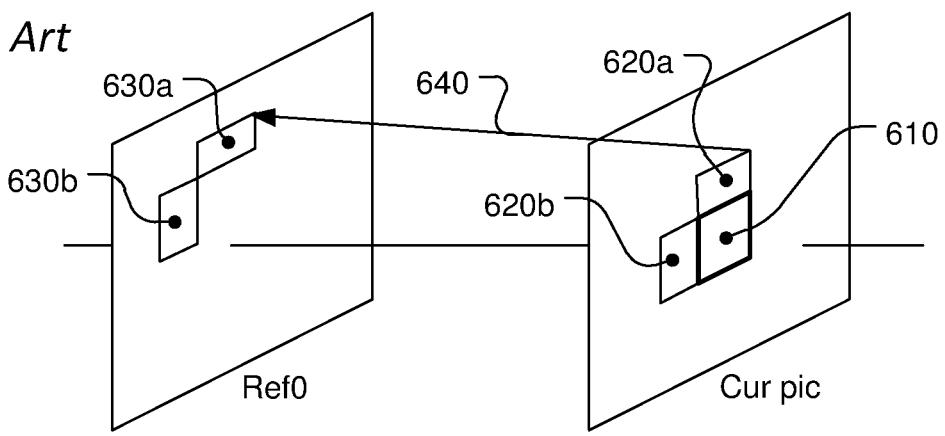
FIG. 6 illustrates an example of motion compensation using the template matching technique, where the template of the current block is matched with the reference template in a reference picture.
Figure 7:
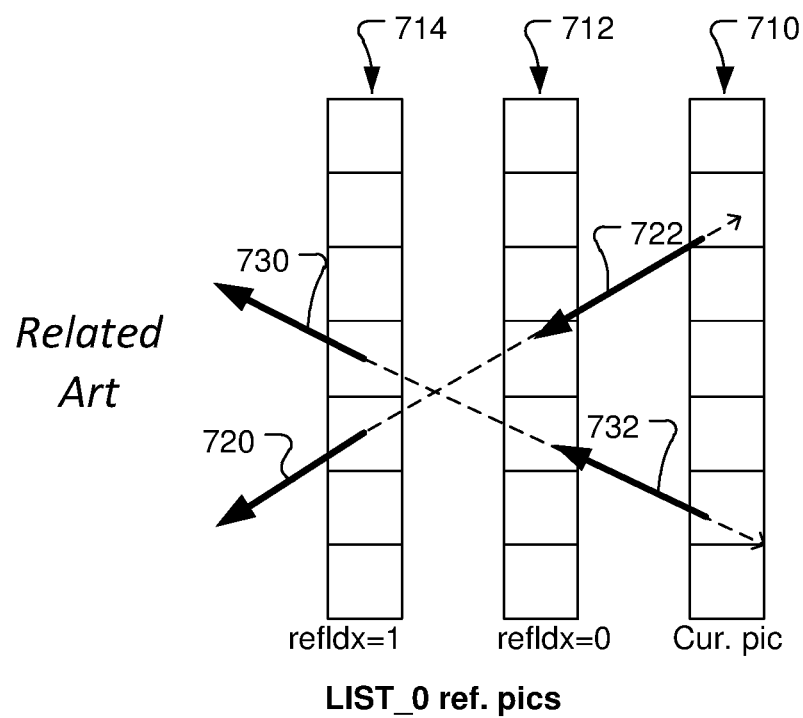
FIG. 7 illustrates an example of temporal motion vector prediction (MVP) derivation process for LIST_0 reference pictures.

The following description is of the best-contemplated mode of carrying out the invention. This description is made for the purpose of illustrating the general principles of the invention and should not be taken in a limiting sense. The scope of the invention is best determined by reference to the appended claims.

To improve the coding efficiency, new methods to generate the motion vector predictor (MVP) are disclosed in this invention. In the present invention, a priority-based motion vector predictor (MVP) derivation process for video coding is disclosed. In one embodiment, the method is applied to Inter mode or AMVP scheme. For a target reference picture, the decoder side MV derivation method, such as the template matching method, is first applied to find a best matched template reference block in the target reference picture. If the best matched template reference block is found, its corresponding MV is used as the motion vector predictor for the Inter mode or AMVP scheme. Only when the best matched template reference block is not found (i.e., the corresponding MV being unavailable), the first available MVP in the original AMVP list will be derived as the MVP for the Inter mode. The original AMVP list includes two spatial MVP candidates: i.e., a left MVP candidate that is derived as the first available MVP from $A_0$, $A_1$ and an above MVP candidate that is derived as the first available MVP from $B_0$, $B_1$, $B_2$, and one temporal MVP candidate that is derived as the first available MVP from the temporal reference blocks $T_{BR}$ and $T_{CT}$.

In one embodiment for the Inter mode, an Inter prediction indicator is firstly transmitted at the encoder side to denote list-0 prediction, list-1 prediction, or bi-prediction. At the decoder side, the Inter prediction indicator is derived from the video bitstream. After that, one or two reference indices are transmitted at the encoder side when there are multiple reference pictures. For list-0 or list-1 prediction, one reference index will be transmitted by the encoder, so the corresponding target reference picture in list 0 or list 1 can be identified at the decoder side. For bi-prediction, two reference indices will be transmitted by the encoder, so the target reference pictures in list 0 and list 1 can be identified at the decoder side. Accordingly, at the decoder side, one or two reference indices will be derived from the video bitstream when there are multiple reference pictures. For each list, the first available MVP candidate in the candidate list based on a priority order is selected as the MVP for the Inter mode. In one example, the candidate list including candidates based on a pre-defined priority order is shown as follows:
 1. The MVP derived from the decoder side MV derivation method such as the template matching method or the bilateral matching method.
 2. Left candidate (the first available from $A_0$, $A_1$);
 3. Top candidate (the first available from $B_0$, $B_1$, $B_2$);
 4. Temporal candidate (the first available from $T_{BR}$ and $T_{CT}$).

In this embodiment, the MVP associated with the bilateral matching mode or the template matching mode (i.e., the MVP derived from the decoder side MV derivation method) is located at a top priority location in the candidate list. That is, the priority of the MVP associated with the bilateral matching mode or the template matching mode is higher than that of the other candidates in the candidate list. Please note that no MVP index needs to be transmitted since the final MVP is implicitly derived as the first available MVP in the candidate list. If no candidate is available, a default MVP such as zero MVP, MV=(0,0), can be used as the final MVP.

In another embodiment for the Inter mode, an Inter prediction indicator is firstly transmitted at the encoder side or derived at the decoder side to denote list-0 prediction, list-1 prediction, or bi-prediction. After that, one or two reference indices are transmitted at the encoder side or derived at the decoder side when there are multiple reference pictures. For each list, the MVP derived from the decoder side MV derivation method such as the template matching method or the bilateral matching method is used as the MVP for the Inter mode. If that MVP is unavailable, a default MVP is used.

In another embodiment, a MVP including the Inter prediction indicator, reference indices, and the motion vector derived from the decoder side MV derivation method such as the template matching method or the bilateral matching method is directly used as the MVP for the Inter mode, Merge and/or Skip mode. If that MVP is unavailable, a default MVP is used.

In another embodiment, a flag is first transmitted at the encoder side and derived at the decoder side to indicate whether the MVP derived from the decoder side MV derivation method such as the template matching method or the bilateral matching method is used for the Inter mode. If the decoder side derived MVP is not used, a MVP index is further transmitted to indicate a selected candidate from the candidate list which includes at least two candidates selected from a candidate set comprising the Left candidate, Top candidate and the Temporal candidate(s).

In one embodiment, the order of the candidate in the candidate list can be explicitly transmitted in the bit-stream. For example, it can be transmitted in the sequence, view, picture, slice, picture parameter set (PPS), sequence parameter set (SPS), video parameter set (VPS), adaptive parameter set (APS), CTU, CTB, LCU, CU, PU, and/or TU level (or header). The order can also be implicitly derived according to the statistic of the coded MV information from the previous coded CU/PU(s) in the current slice/picture or in previous coded slice/picture.

In another embodiment, a flag is signalled to indicate whether this proposed priority-based MVP derivation process or a convention MVP derivation method with MVP index transmitted is used for the Inter mode. The flag can be explicitly transmitted in the bit-stream at the sequence, view, picture, slice, SPS, VPS, APS, PPS, CTU, CTB, LCU, CU, PU, and/or TU level (or header).

In another embodiment, the proposed method is applied on the Merge and/or Skip mode. None of the Inter prediction indicator (denoted as list-0 prediction, list-1 prediction, or bi-prediction), reference indices, and the candidate indices needs to be transmitted. The first available MVP in the candidate list based on a pre-defined priority order is selected as the final MVP for the Merge and/or Skip mode. The Inter prediction indicator and the reference index (or indices) are directly inherited from that final MVP. For example, the candidate list includes the following candidates:
 1. The MVP derived from the decoder side MV derivation method such as the template matching method or the bilateral matching method.
 2. Left candidate ($A_1$);
 3. Top candidate ($B_1$);
 4. Above right candidate ($B_0$);

5. Below left candidate ($A_0$);
6. Above left candidate ($B_2$), used only when any of the above spatial candidates is unavailable;
7. Temporal candidate (the first available from $T_{BR}$ and $T_{CT}$).

Only when the MVP derived from the decoder side MV derivation method being unavailable, the first available MVP in the original Merge candidate list will be derived as the MVP.

In one embodiment, the order of the candidate in the candidate list can be explicitly transmitted in the bit-stream. For example, it could be transmitted in the sequence, view, picture, slice, SPS, VPS, APS, PPS, CTU, CTB, LCU, CU, PU, and/or TU level (or header). The order can also be implicitly derived according to the statistic of the coded MV information from the previous coded CU/PU(s) in the current slice/picture or in previous coded slice/picture.

In another embodiment, a flag is signalled to indicate whether the priority-based MVP derivation process or the convention MVP derivation method with MVP index transmitted is used for the Merge and/or Skip mode. The flag can be explicitly transmitted in the bit-stream in the sequence, view, picture, slice, SPS, VPS, APS, PPS, CTU, CTB, LCU, CU, PU, and/or TU level (or header).

In another embodiment, when current block is bi-prediction block, the conventional AMVP or any other MVP scheme can be applied to list 0 (list1) for MVP derivation, while list 1 (list 0) MVP uses priority-based MVP derivation process that directly uses the first available MVP candidate in the candidate list according to a pre-defined priority order, wherein the candidate list includes the decoder-side derived MVP such as the MVP associated with the bilateral matching method or the template matching mathod.

Figure 8:
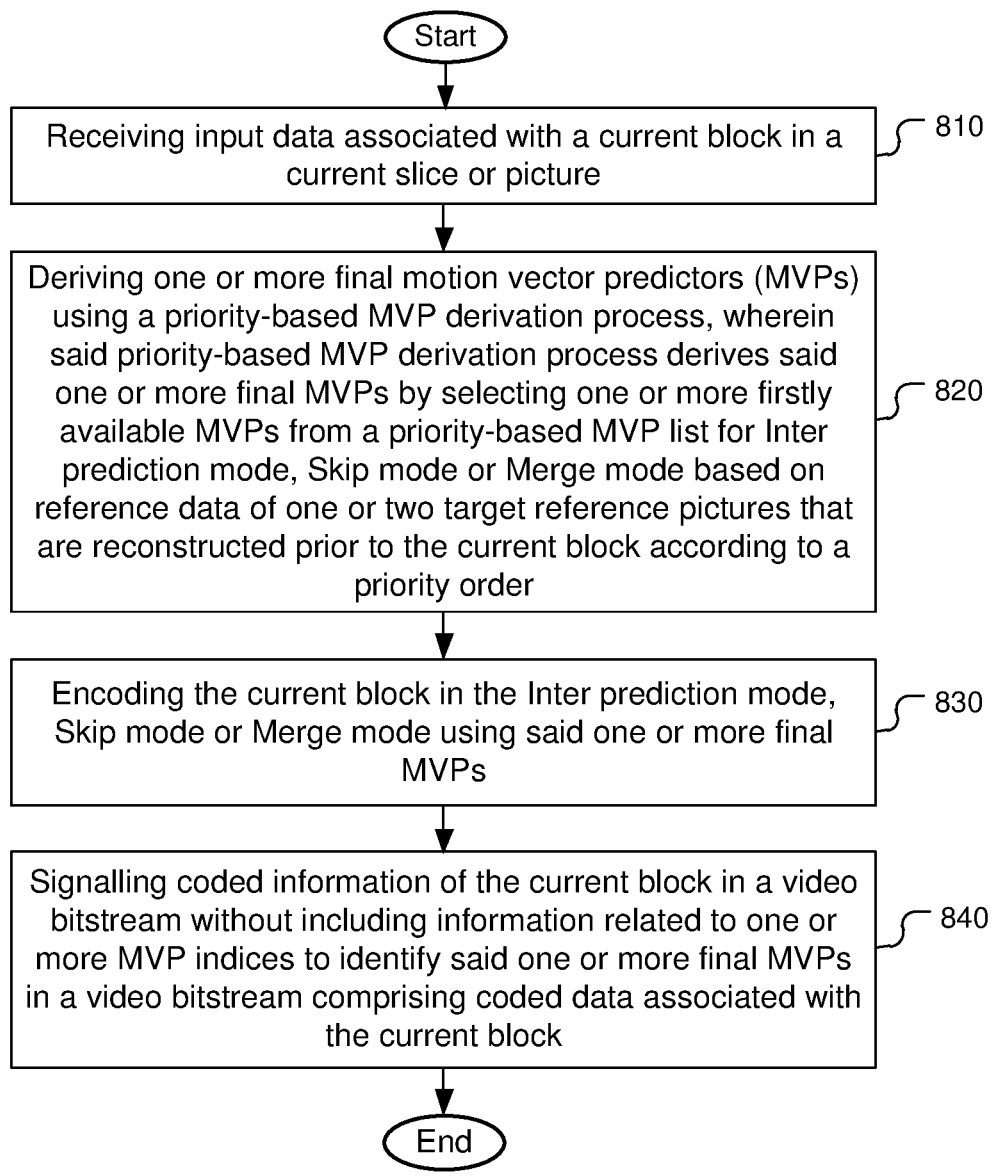
FIG. 8 illustrates an exemplary flowchart of priority-based MVP (motion vector predictor) derivation for motion compensation in a video encoder.

FIG. 8 illustrates an exemplary flowchart of priority-based MVP (motion vector predictor) derivation for motion compensation in a video encoder. This method receives input data associated with a current block in a current slice or picture in step 810. The input data may correspond to pixel data to be coded using Inter, Merge or Skip mode. One or more final motion vector predictors (MVPs) using priority-based MVP derivation process are derived in step 820, wherein the priority-based MVP derivation process derives said one or more final MVPs by selecting firstly available MVPs from a priority-based MVP list for Inter prediction mode, Skip mode or Merge mode based on reference data of one or two target reference pictures that are reconstructed prior to the current block according to a priority order. The current block is encoded in the Inter prediction mode, Skip mode or Merge mode using said one or more final MVP in step 830. Coded information of the current block is signalled in a video bitstream without including information related to one or more MVP indices to identify said one or more final MVPs in a video bitstream comprising coded data associated with the current block in step 840.

Figure 9:
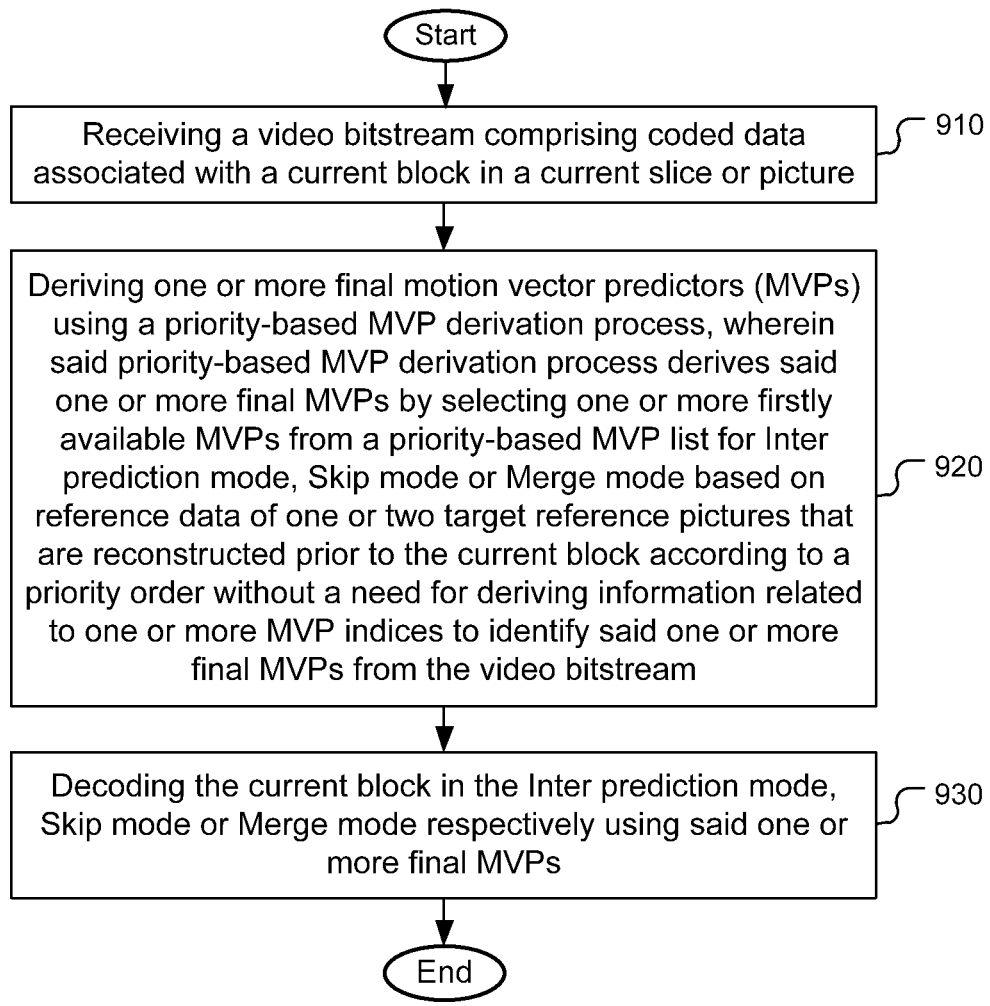
FIG. 9 illustrates an exemplary flowchart of priority-based MVP (motion vector predictor) derivation for motion compensation in a video decoder.

FIG. 9 illustrates an exemplary flowchart of priority-based MVP (motion vector predictor) derivation for motion compensation in a video decoder. The method receives a video bitstream comprising coded data associated with a current block in a current slice or picture in step 910. One or more final motion vector predictors (MVPs) are derived using a priority-based MVP derivation process in step 920, which derives said one or more final MVPs by selecting firstly available MVPs from a priority-based MVP list for Inter prediction mode, Skip mode or Merge mode based on reference data of one or two target reference pictures that are reconstructed prior to the current block according to a priority order without a need for deriving information related to one or more MVP indices to identify said one or more final MVPs from the video bitstream. The current block is decoded in the Inter prediction mode, Skip mode or Merge mode using said one or more final MVPs in step 930.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:
1. A method of priority-based MVP (motion vector predictor) derivation for motion compensation in a video decoder, the method comprising:

receiving a video bitstream comprising coded data associated with a current block in a current slice or picture;

deriving one or more final motion vector predictors (MVPs) using a priority-based MVP derivation process, wherein said priority-based MVP derivation process derives said one or more final MVPs by selecting one or more firstly available MVPs from a priority-based MVP list for Inter prediction mode, Skip mode or Merge mode based on reference data of one or two target reference pictures that are reconstructed prior to the current block according to a priority order without a need for deriving information related to one or more MVP indices to identify said one or more final MVPs from the video bitstream; and decoding the current block coded in the Inter prediction mode, Skip mode or Merge mode using said one or more final MVPs.

2. The method of claim 1, wherein the priority-based MVP list for the Inter prediction mode, Skip mode or Merge mode includes one or more MVPs associated with a bilateral matching mode or a template matching mode.

3. The method of claim 2, wherein said one or more MVPs associated with the bilateral matching mode or the template matching mode are located at a top priority location in the priority-based MVP list.

4. The method of claim 2, wherein said following candidates are derived only when said one or more MVPs associated with the bilateral matching mode or the template matching mode are not available.

5. The method of claim 2, wherein said following candidates are derived only when said one or more MVPs associated with the bilateral matching mode or the template matching mode are not available.

6. The method of claim 1, wherein when the current block is coded using the Inter prediction mode, an Inter prediction indicator is derived from the video bitstream, wherein the Inter prediction indicator indicates whether the current block is coded using list-0 prediction, list-1 prediction or bi-prediction.

7. The method of claim 6, wherein when list-0 prediction or list-1 prediction is used and more than one reference picture exists in corresponding list 0 or list 1, one reference index is derived from the video bitstream to identify said one target reference picture in the corresponding list 0 or list 1, and wherein when the bi-prediction is used and more than one reference picture exists in both the list 0 and the list 1, two reference indices are derived from the video bitstream to identify said two target reference pictures in the list 0 and the list 1.

8. The method of claim 1, wherein when the current block is coded using the Skip mode or Merge mode, an Inter prediction indicator for indicating whether the current block is coded using list-0 prediction, list-1 prediction or bi-prediction, and one or more reference indices for identifying said one or two target reference pictures in corresponding list 0, list 1, or both are inherited from said one or more final MVPs.

9. The method of claim 1, wherein if no candidate is available in the priority-based MVP list, a default value is assigned to said one or more final MVPs.

10. The method of claim 1, wherein information related to the priority order is derived from a syntax level or header in the video bitstream corresponding to a sequence, view, picture, slice, SPS (sequence parameter set), VPS (video parameter set), APS (adaptive parameter set), CTU (coding tree unit), CTB (coding tree block), LCU (largest coding tree), CU (coding unit), PU (prediction unit), TU (transform unit) level, or a combination thereof.

11. The method of claim 1, wherein information related to the priority order is derived implicitly according to statistic of coded MV information from one or more previously coded blocks in the current slice or picture or in a previous coded slice or picture.

12. The method of claim 1, wherein the priority order corresponds to a pre-defined priority order.

13. The method of claim 1, wherein a flag is derived from the video bitstream to control whether said priority-based MVP derivation process or a conventional MVP derivation process is used to derive said one or more final MVPs, and wherein the flag is in a syntax level or header of the video bitstream corresponding to a sequence, view, picture, slice, SPS (sequence parameter set), VPS (video parameter set), APS (adaptive parameter set), CTU (coding tree unit), CTB (coding tree block), LCU (largest coding tree), CU (coding unit), PU (prediction unit), TU (transform unit) level, or a combination thereof.

14. The method of claim 1, wherein when the current block is coded using bi-prediction, said priority-based MVP derivation process is used to derive said one or more final MVPs for one reference list and a conventional MVP derivation process is used to derive said one or more final MVPs for another reference list.

15. An apparatus of priority-based MVP (motion vector predictor) derivation for motion compensation in a video decoder, the apparatus comprising one or more electronic devices or processors configured to:

receive a video bitstream comprising coded data associated with a current block in a current slice or picture;

derive one or more final motion vector predictors (MVPs) using a priority-based MVP derivation process, wherein said priority-based MVP derivation process derives said one or more final MVPs by selecting one or more firstly available MVPs from a priority-based MVP list for Inter prediction mode, Skip mode or Merge mode based on reference data of one or two target reference pictures that are reconstructed prior to the current block according to a priority order without a need for deriving information related to one or more MVP indices to identify said one or more final MVPs from the video bitstream; and decode the current block coded in the Inter prediction mode, Skip mode or Merge mode using said one or more final MVPs.

16. A method of priority based MVP (motion vector predictor) derivation for motion estimation/compensation in a video encoder, the method comprising:

receiving input data associated with a current block in a current slice or picture;

deriving one or more final motion vector predictors (MVPs) using a priority-based MVP derivation process, wherein said priority-based MVP derivation process derives said one or more final MVPs by selecting one or more firstly available MVPs from a priority-based MVP list for Inter prediction mode, Skip mode or Merge mode based on reference data of one or two target reference pictures that are reconstructed prior to the current block according to a priority order;

encoding the current block in the Inter prediction mode, Skip mode or Merge mode using said one or more final MVPs; and signalling coded information of the current block in a video bitstream without including information related to one or more MVP indices to identify said one or more final MVPs in the video bitstream comprising coded data associated with the current block.

17. The method of claim 16, wherein the priority-based MVP list for the Inter prediction mode, Skip mode or Merge mode includes one or more MVPs associated with a bilateral matching mode or a template matching mode.

18. The method of claim 17, wherein said one or more MVPs associated with the bilateral matching mode or the template matching mode are located at a top priority location in the priority-based MVP list.

19. The method of claim 17, wherein said following candidates are derived only when said one or more MVPs associated with the bilateral matching mode or the template matching mode are not available.

20. An apparatus of priority-based MVP (motion vector predictor) derivation for motion estimation/compensation in a video encoder, the apparatus comprising one or more electronic devices or processors configured to:

receive input data associated with a current block in a current slice or picture;

derive one or more final motion vector predictors (MVPs) using a priority-based MVP derivation process, wherein said priority-based MVP derivation process derives said one or more final MVPs by selecting one or more firstly available MVPs from a priority-based MVP list for Inter prediction mode, Skip mode or Merge mode based on reference data of one or two target reference pictures that are reconstructed prior to the current block according to a priority order;

encode the current block in the Inter prediction mode, Skip mode or Merge mode using said one or more final MVPs; and signal coded information of the current block in a video bitstream without including information related to one or more MVP indices to identify said one or more final MVPs in the video bitstream comprising coded data associated with the current block.

\* \* \* \* \*